C. E. MATTESON & C. W. BAILEY.
DIRIGIBLE HEADLIGHT.
APPLICATION FILED SEPT. 5, 1917.

1,254,053.

Patented Jan. 22, 1918.
2 SHEETS—SHEET 1.

Witnesses

C. E. Matteson and C. W. Bailey, Inventor by Attorneys

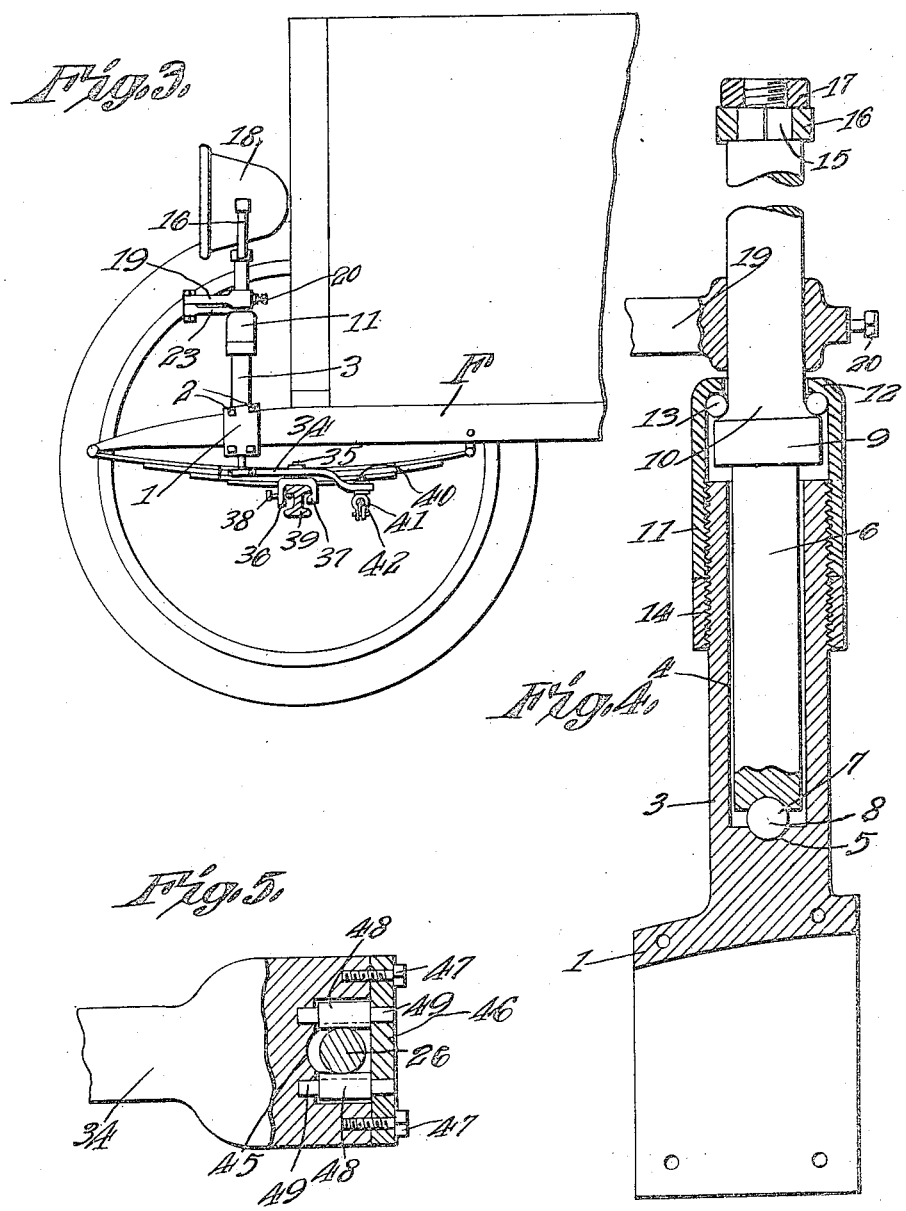

UNITED STATES PATENT OFFICE.

CHARLES E. MATTESON AND CHARLES W. BAILEY, OF MAUD, OKLAHOMA.

DIRIGIBLE HEADLIGHT.

1,254,053.            Specification of Letters Patent.        Patented Jan. 22, 1918.

Application filed September 5, 1917. Serial No. 189,822.

*To all whom it may concern:*

Be it known that we, CHARLES E. MATTESON and CHARLES W. BAILEY, citizens of the United States, residing at Maud, in the county of Pottawatomie, State of Oklahoma, have invented a new and useful Dirigible Headlight, of which the following is a specification.

The present invention relates to dirigible headlights or lamps for automobiles, and aims to provide novel and improved means for turning the lamps from the steering gear, in order that the light will be directed toward one side or the other when turning corners, to avoid collisions and accidents, especially when traveling on tortuous roads.

It is the object of the invention to provide a mechanism of the nature indicated of such construction that it can be conveniently applied to the frame and steering gear of an automobile to operate in a practical and efficient manner.

With the foregoing and other objects in view, which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

The invention is illustrated in the accompanying drawings, wherein:

Fig. 3 is a side elevation thereof.

Fig. 4 is an enlarged sectional detail of one of the lamp standards or posts.

Fig. 5 is a sectional detail to show the rollers of the actuating lever.

Figure 1:
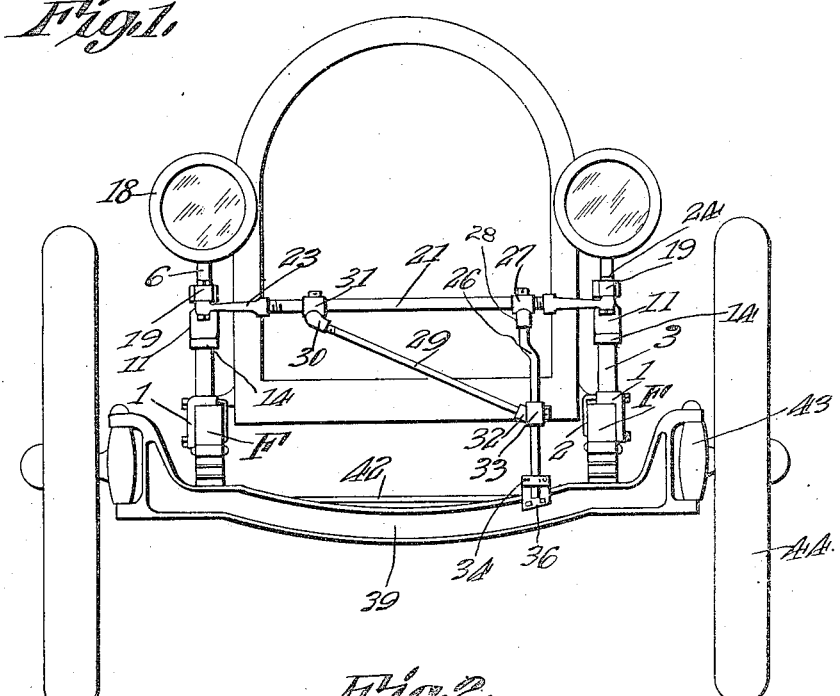
Figure 1 is a front view showing the device applied to an automobile.
Figure 2:
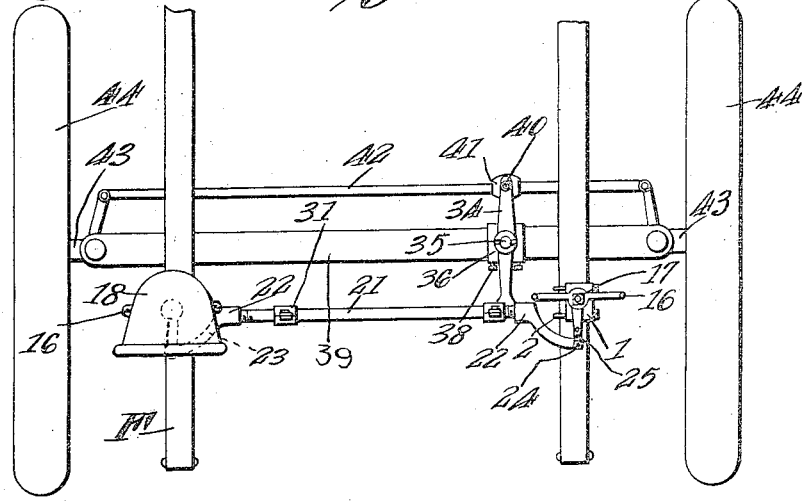
Fig. 2 is a plan view of the device.

In carrying out the invention, there are provided two lamp standards or posts, each of which embodies an angular base 1, to fit the outer side and top of one side beam of the automobile frame F, and said base is fastened to the frame by means of U-bolts 2 fitting the beam of the frame from the inside, and having its terminals engaged through the base above and below said beam. The base 1 is provided with the upstanding post member 3 of tubular form, the bore 4 being provided at its lower end with a concaved seat 5, and said bore receives the lower terminal of a vertical rock shaft 6 forming a part of the lamp standard. The lower end of the shaft 6 has a concaved recess 7 fitting a ball 8 which seats in the seat 5, to provide an anti-frictional step bearing for the rock shaft 6, so that it will turn easily. The rock shaft 6 has a collar 9 immediately above the member 3 and provided with an upper annular ball race 10, and a cap 11 is threaded on the upper end of the member 3 and projects thereabove to surround the collar 9. The upper end of the cap 11 has an inturned annular flange or lip 12 overhanging the collar 9, and anti-frictional balls 13 bear against the ball race 10 and in the annular ball race of the cap 11 formed by the flange 12, thus centering the shaft 6 within the member 3 for free rotation. The cap 11 is threaded downwardly so that the flange 12 bears on the balls 13 which are seated on the ball race 10, thus holding the shaft 6 down on the ball 8, to prevent rattling, yet permitting the shaft 6 to turn with little friction. A jam or lock nut 14 is threaded on the member 3 to abut upwardly against the cap 11 so as to hold the same in place.

The upper end of the shaft 6 has a non-circular portion 15 on which the lamp fork or bracket 16 is fitted and held by means of a nut 17 threaded onto the upper reduced end of the shaft, a lamp 18 being carried as usual within the fork or bracket 16. Thus, the lamp is mounted for turning movement about a vertical axis, so that the light can be directed toward opposite sides, to facilitate steering in the dark.

The two shafts 6 are linked together for simultaneous turning movement, and for this purpose, forwardly projecting arms 19 embracing the shafts 6 are secured thereto by means of set screws 20 or the like, and said arms are connected by a transverse link including a rod 21 between said shafts or the lamp standards, and caps 22 threadedly or otherwise engaged upon the ends of the rod 21 and having arms 23 extending forwardly and outwardly. Said arms 23 are pivoted by means of bolts 24 or other pivots to the arms 19, said arms 19 having the series of apertures 25 for the adjustable reception of the bolts 24. By adjusting the bolts 24 in the apertures 25, this will regulate the turning movement of the shafts 6 as desired. The curvature of the arms 23 offsets the rod 21 of the link rearwardly between the lamp standards.

In order that the rod or link member 21 can be reciprocated transversely from the steering gear, a depending rod 26 is connected thereto near one end thereof by means of a clamp 27 embracing said rod 21 near one arm 23, and having a depending socket 28 into which the upper end of the rod 26 is threaded or otherwise secured. The rod 26 is braced to prevent the transverse bending thereof, by means of inclined brace rod 29 having its upper end threadedly or otherwise engaged within a lower socket 30 of a clamp 31 embracing the rod 21 near that end opposite to the clamp 27, and the lower end of the rod 29 is threadedly or otherwise engaged in a socket 32 of a clamp 33 embracing the rod 26. Thus, when the lower end of the rod 26 is moved sidewise, said rod will not be bent or flexed, the rod 29 transmitting the movement to the rod 21 in an effective manner.

An actuating lever 34 is pivotally mounted between its ends upon an upstanding stud or pintle 35 of an inverted U-shaped fulcrum member 36 straddling the axle 39 near one side of the automobile, one limb of the member or saddle 36 having a rib or lug 37 to engage under the upper flange of the axle 39 which is of I cross section and set screws 38 are engaged through the other limb of said saddle to engage under said flange for holding the saddle firmly in place. The rear end or arm of the lever 34 is pivotally engaged over the upstanding stud or pintle 40 of a clamp or clip 41 embracing the steering rod 42 which connects the knuckles 43 that are pivoted to the ends of the front axle 39 for angling the wheels 44. Thus, when the rod 42 is moved longitudinally of itself for purpose of steering, this will swing the lever 34. The forward end or arm of the lever 34 is bifurcated and has the slot or recess 45 for receiving the lower terminal of the rod 26, a cap plate or bar 46 being fastened by screws 47 or other means to said forward end of the lever 34 across the recess 45. Rollers 48 are disposed at opposite sides of the recess 45 for the contact of the rod 26 thereagainst, and said rollers have reduced ends 49 journaled within the plate 46 and lever 34, whereby said rollers can rotate to reduce the friction between the lever 34 and rod 26 when the lever is swung.

In operation, it will be noted that the lever 34 in being swung by the movement of the rod 42 in steering the vehicle, will move the rod 26 in a direction opposite to the direction of movement of the rod 42, thereby through the medium of the link rod 21 and arms 19, swinging the lamps 18 so that the light will be directed in the same direction as the wheels 44. Thus, when turning corners the light will be directed toward the respective sides, the advantages of which are obvious. The clamps 27 and 31 in embracing the rod 21, enable the rod 26 to extend downwardly in the proper direction to pass through the recess 45 of the lever 34, and the turning movement of the lamps with respect to the wheels 44 can be adjusted by adjusting the bolts or pivots 24 in the apertures 25.

Having thus described the invention, what is claimed as new is:

1. A device of the character described embodying lamp supporting shafts rotatable about vertical axes and having arms, a link connecting said arms, a depending member attached to the link, a lever having means for pivoting it upon an axle and steering rod, and rollers carried by said lever for engaging the lower end of the depending member.

2. A device of the character described embodying lamp supporting shafts rotatable about vertical axes and having arms, a link connecting said arms, a depending member attached to the link, and a lever having means for pivoting it upon an axle and steering rod, a recess for receiving the lower terminal of said depending member, and rollers at the opposite sides of said recess for the contact of said member.

3. A device of the character described embodying lamp carrying members rotatable about vertical axes and having arms, a link connecting said arms, a depending member carried by the link, a lever having means for pivoting it on an axle and steering rod and having a bifurcated end with a recess to receive said depending member, a cap plate secured to said end of the arm across said recess, and rollers at the opposite sides of said recess for the contact of the depending member journaled to the lever and plate.

In testimony that we claim the foregoing as our own, we have hereto affixed our signatures in the presence of two witnesses.

CHARLES E. MATTESON.
CHARLES W. BAILEY.

Witnesses:
  SAM F. BAILEY,
  WALTER CAUDELL.